Jan. 27, 1953          S. F. MARTINEAU          2,626,776
VALVE SEAT
Filed Oct. 2, 1950
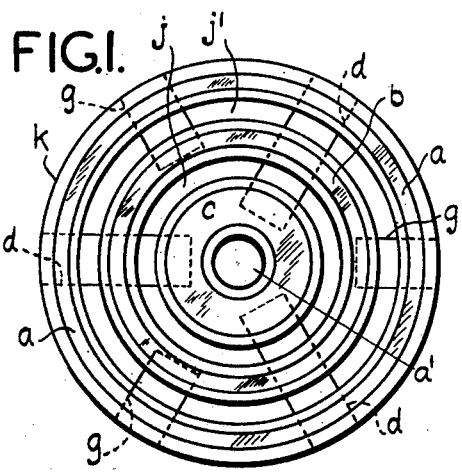
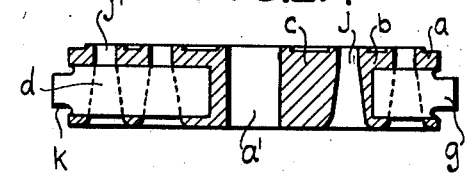
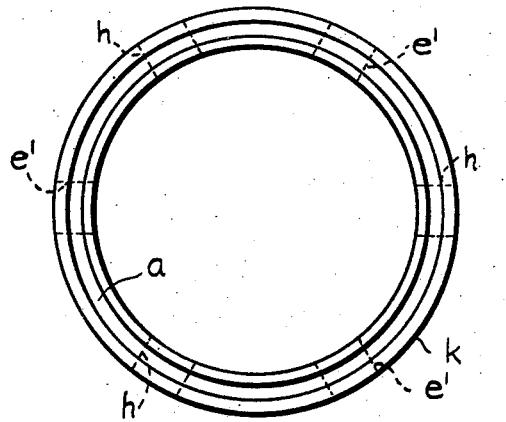
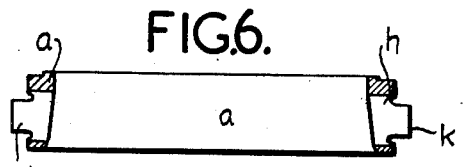
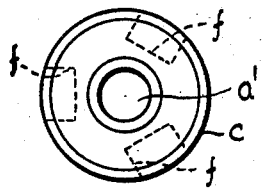
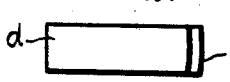
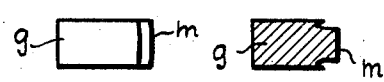
INVENTOR
STEPHEN FELIX MARTINEAU
By *P. I. Freeman*
ATTORNEY.

Patented Jan. 27, 1953

2,626,776

UNITED STATES PATENT OFFICE 2,626,776

VALVE SEAT

Stephen F. Martineau, Birmingham, England

Application October 2, 1950, Serial No. 187,950
In Great Britain July 7, 1950

1 Claim. (Cl. 251—167)

This invention has reference to valves, such as used in compressors, pumps, blowers and similar apparatus, of the type which comprises a seat having a plurality of arcuate or part-annular and concentric slots formed therein to enable air, gas or other fluid to pass through the seat.

Heretofore, it has been customary to produce each slotted valve seat from a single casting, or a solid disc or blank, of iron, steel or other metal or alloy by turning and/or milling operations.

The principal object of the present invention is to simplify and reduce the costs of manufacture of the slotted valve seats.

A further object of the invention is to provide a valve seat which is built up from component parts each of which is capable of being produced to accurate dimensions with a minimum of operations.

Still another object of the invention is to provide a valve seat which is built up from component parts which are adapted to be held firmly together, in concentric relationship, in a simple and speedy manner.

A further object of the invention is to provide a valve seat which, although built up from a plurality of component parts, is at least as strong and efficient as a known one-piece seat.

A further object of the invention is to facilitate and reduce the costs of replacements should a valve seat be damaged or become worn as a consequence of long and frequent use.

These and other objects and advantages of the invention will become apparent upon consideration of the following detailed specification and the accompanying drawings wherein there is specifically disclosed a preferred embodiment of the invention.

In the drawings—

Figure 1 is a plan of a seat comprising a centre-piece and two concentric rings, assembled together by three longer and three shorter fixing pins or studs.

Figure 2 is a sectional elevation of Figure 1.

Figures 3, 4, and 5 are, respectively, plans of the outer ring, the inner ring and the centre-piece.

Figures 6, 7, and 8 are sectional elevations of the components shown in Figures 3, 4 and 5 respectively.

Figure 9 is a plan of one of the longer fixing pins or studs.

Figure 10 is a sectional elevation of the pin or stud shown in Figure 9.

Figure 11 is a plan of one of the shorter fixing pins or studs, and

Figure 12 is a sectional elevation of the pin or stud shown in Figure 11.

The valve seat shown in Figures 1 and 2 comprises an outer and larger ring $a$, an inner and smaller ring $b$, and a centre-piece $c$. The external diameter of the centre-piece is less than the internal diameter of the ring $b$ by an amount which is equal to the difference between the external diameter of the inner ring and the internal diameter of the outer ring $a$ so that when the three components are located in concentric relationship they are spaced apart by slots $j$ and $j^1$ of substantially identical width.

The centre-piece is formed with the axial bore $a^1$ and with three blind holes $f$, which are spaced at 120° apart, in its periphery. The inner ring is formed with three radial holes $e$ which are also spaced at 120° apart and with three blind holes $i$ in its external periphery, the holes $e$ alternating with the holes $i$ and being spaced from the latter by 60°. The outer ring is formed with six radial holes which are spaced apart by 60°, the alternate holes being identified by the reference letters $e^1$ and $h$ respectively; a flange $k$ is formed around the external periphery of the said outer ring.

Thus, when the rings $a$, $b$, and centre-piece $c$ are concentrically related with the holes $e^1$, $e$ and $f$ substantially in register with one another, the holes $h$ will also be substantially in register with the holes $i$, so that a fixing pin or stud $d$ may be passed through each hole $e^1$ in the outer ring and through the corresponding hole $e$ in the inner ring, into engagement with the corresponding blind hole $f$ in the centre-piece $c$; also a shorter pin $g$ may be passed through each hole $h$ in the outer ring into engagement with the corresponding blind hole $i$ in the inner ring. The pins $d$ fix the three component parts of the seat together whereas the pins $g$ add to the strength of the assembly. The outer end of each pin $d$ and $g$ is formed with a flange $m$ which, in the complete assembly, is located in circumferential and flush alignment with the flange $k$ of the outer ring so that the seat is provided with a complete and smooth circumferential flange.

The pins are a close fit within their respective holes and, owing to the fact that, in practice, the holes in each of the several groups are slightly out of alignment, the pins are held securely in position.

The rings, centre-piece and pins may be made of any desired and suitable metal or alloy, but normally the rings and centre-piece will be made of steel and the pins will be made of a steel alloy having a high tensile strength and will be cut from rod of such material.

It will be appreciated that each of the rings $a$ and $b$, the centre-piece $c$, and each of the pins $d$ and $g$, are capable of being produced from a casting, blank or rod with a minimum number of machine operations, and that each of the said operations may be carried out easily, quickly and accurately, since all faces of the said components are readily accessible to machine tools.

Furthermore, should any one of the components become worn or damaged, the seat may be dismantled and the worn or damaged component replaced without difficulty and at a minimum cost.

Although in the specific embodiment of the invention described and shown, the seat comprises two concentric rings, it will be appreciated that the number of rings may be varied to suit specific requirements, and also that the number of assembly pins provided in any given seat may be varied, as desired. Consequently, the said specific embodiment of the invention should be considered as illustrative only, and reference should be had to the appended claim in determining the scope of the invention.

Having described my invention, what I claim and desire to secure by Letters Patent is:

An inherently rigid valve seat comprising a separate and inherently rigid centre-piece, a first ring of greater internal diameter than the external diameter of the centre-piece, a second separate and inherently rigid ring of greater internal diameter than the external diameter of the first ring, the centre-piece having blind peripheral pockets in radial alignment with complementary holes in each of the said rings, the said first ring having blind holes in its external periphery in radial alignment with complementary additional holes in said second ring, one system of separate and inherently rigid pins extending through holes in both the said rings into engagement with the complementary pockets in the centre-piece, and a second system of separate and inherently rigid shorter pins extending through the additional holes in the said second ring into engagement with the blind holes in the said first ring, the centre-piece and rings being located in concentric, relatively rigid and radially spaced relationship.

STEPHEN F. MARTINEAU.

REFERENCES CITED

The following references are of record in the file of this patent:

UNITED STATES PATENTS

| Number | Name | Date |
|---|---|---|
| 528,150 | Coram | Oct. 30, 1894 |
| 1,553,323 | Parks | Sept. 15, 1925 |
| 2,266,408 | Bruestle | Dec. 16, 1942 |
| 2,483,572 | Cater | Oct. 4, 1949 |

FOREIGN PATENTS

| Number | Country | Date |
|---|---|---|
| 122,627 | Great Britain | of 1919 |
| 352,038 | Great Britain | of 1930 |
| 543,006 | Great Britain | of 1942 |